US008606788B2

(12) United States Patent
Chen et al.

(10) Patent No.: US 8,606,788 B2
(45) Date of Patent: Dec. 10, 2013

(54) DICTIONARY FOR HIERARCHICAL ATTRIBUTES FROM CATALOG ITEMS

(75) Inventors: Zhimin Chen, Redmond, WA (US); Eduardo Laureano, Bellevue, WA (US); Renfei Luo, Kirkland, WA (US); Tsheko Mutungu, Kirkland, WA (US); Vivek Narasayya, Redmond, WA (US); David Talby, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 358 days.

(21) Appl. No.: 13/160,532

(22) Filed: Jun. 15, 2011

(65) Prior Publication Data

US 2012/0323921 A1     Dec. 20, 2012

(51) Int. Cl.
*G06F 17/30* (2006.01)

(52) U.S. Cl.
USPC .......................................................... 707/740

(58) Field of Classification Search
None
See application file for complete search history.

(56) References Cited

U.S. PATENT DOCUMENTS

| | | | | | |
|---|---|---|---|---|---|
| 4,965,763 | A | * | 10/1990 | Zamora | 704/1 |
| 5,355,491 | A | * | 10/1994 | Lawlor et al. | 717/147 |
| 7,284,196 | B2 | * | 10/2007 | Skeen et al. | 715/234 |
| 2005/0154690 | A1 | * | 7/2005 | Nitta et al. | 706/46 |
| 2006/0116869 | A1 | * | 6/2006 | Kimura et al. | 704/200 |
| 2009/0327243 | A1 | * | 12/2009 | Pradhan et al. | 707/999.003 |

OTHER PUBLICATIONS

Abramowicz, et al., "Supporting Topic Map Creation Using Data Mining Techniques", Retrieved at <<http://journals.sfu.ca/acs/index.php/ajis/article/viewPDFInterstitial/147/127?ads=>>, Australasian Journal of Information Systems, 2003, pp. 63-78.
Stocia, et al., "Automating Creation of Hierarchical Faceted Metadata Structures", Retrieved at <<http://acl.Idc.upenn.edu/N/N07/N07-1031.pdf>>, The Conference of the North American Chapter of the Association for Computational Linguistics in Human Language Technologies, Apr. 2007, 8 Pages.
Ramakrishnan, et al., "A Structure-sensitive Framework for Text Categorization", Retrieved at <<http://www.cse.iitb.ac.in/~ganesh/papers/CIKM2005.pdf>>, Proceedings of the 14th ACM international conference on Information and knowledge management, 2005, 8 Pages.
Tiun, et al., "Automatic Topic Identification Using Ontology Hierarchy", Retrieved at <<http://citeseerx.ist.psu.edu/viewdoc/download-?doi=10.1.1.1.1560&rep=rep1&type=pdf>>, Proceedings of the Second International Conference on Computational Linguistics and Intelligent Text Processing, 2001, 10 Pages.

(Continued)

*Primary Examiner* — Sathyanarayan Pannala

(57) ABSTRACT

A plurality of items included in a catalog may be obtained, each item associated with an item category. Brand indicators may be obtained, each brand indicator associated with the item category. Brand indicators associated with each of the items may be determined, and the each item may be assigned to a partition group associated with the brand indicator that is associated with the each item. Correlated string tokens that are correlated, greater than a predetermined correlation threshold value, with the brand indicator associated with the partition group that is associated with the each one of the items, the correlated string tokens associated with the each one of the plurality of items, may be determined. A dictionary hierarchy may be generated based on the one or more correlated string tokens.

20 Claims, 11 Drawing Sheets

(56) References Cited

OTHER PUBLICATIONS

Riloff, Ellen, "An empirical study of automated dictionary construction for information extraction in three domains", Retrieved at <<http://citeseerx.ist.psu.edu/viewdoc/download?doi=10.1.1.12.6827&rep=rep1&type=pdf>>, AI Journal, Special volume on empirical methods, vol. 85 No. 1-2, Aug. 1996, 39 Pages.

He et al, "SEISA: Set Expansion by Iterative Similarity Aggregation," WWW 2011, ACM, Mar. 2011, Hyderabad, India.

* cited by examiner

DICTIONARY FOR HIERARCHICAL ATTRIBUTES FROM CATALOG ITEMS

BACKGROUND

Many databases exist for users to request information associated with items included in catalogs. For example, a user may wish to purchase a particular model of a product. The user may input an online search query to attempt to find a merchant or online store that carries the product and the particular model. For example, the user may wish to find a product that has particular features. For example, the user may wish to find a digital camera with particular megapixel and zoom features.

SUMMARY

According to one general aspect, a dictionary manager may include an item input engine configured to obtain a plurality of item character strings, each item character string representing an item in a catalog, each item associated with a category. The dictionary manager may also include a brand input engine configured to obtain a plurality of brand character strings associated with the category. The dictionary manager may also include a brand matching engine configured to determine, for each item character string included in the plurality of item character strings, whether a matched substring of the each item character string represents a match with one of the obtained brand character strings. The dictionary manager may also include a matching indicator engine configured to generate a matching indicator indicating that the each item character string includes a match with the one of the obtained brand character strings, based on a match result of the matching determination by the brand matching engine. The dictionary manager may also include a correlated segment engine configured to obtain, for each one of the obtained brand character strings, and for each one of the item character strings that includes a match with the each one of the obtained brand character strings, one or more correlated segments, other than the matched substring, of the each one of the item character strings that includes a match with the each one of the obtained brand character strings, based on determining that the obtained correlated segments are correlated, greater than a predetermined correlation threshold, with the each one of the obtained brand character strings. The dictionary manager may also include a hierarchy generator configured to generate a dictionary hierarchy based on the obtained correlated segments According to another aspect, a plurality of items included in a catalog may be obtained, each item associated with an item category. A plurality of brand indicators may be obtained, each brand indicator associated with the item category. For each one of the plurality of items, one of the obtained brand indicators that is associated with the each one of the plurality of items may be determined, and the each one of the plurality of items may be assigned to a partition group of items that are associated with the determined brand indicator. One or more correlated string tokens that are correlated, greater than a predetermined correlation threshold value, with the brand indicator associated with the partition group that is associated with the each one of the plurality of items may be determined, the correlated string tokens associated with the each one of the plurality of items. A dictionary hierarchy may be generated based on the one or more correlated string tokens.

According to another aspect, a computer program product tangibly embodied on a computer-readable storage medium may include executable code that, when executed, may cause at least one data processing apparatus to obtain a plurality of items included in a catalog, each item associated with an item category. Further, the at least one data processing apparatus may obtain a plurality of hierarchical attribute types associated with the plurality of items. Further, the at least one data processing apparatus may obtain a plurality of first attribute indicators, each first attribute indicator associated with the item category. Further, the at least one data processing apparatus may, for each one of the plurality of items, determine one of the obtained first attribute indicators that is associated with the each one of the plurality of items, and assign the each one of the plurality of items to a partition group of items that are associated with the determined first attribute indicator. Further, the at least one data processing apparatus may determine one or more correlated string tokens that are correlated, greater than a predetermined correlation threshold value, with the first attribute indicator associated with the partition group that is associated with the each one of the plurality of items, the correlated string tokens associated with the each one of the plurality of items, and generate a dictionary hierarchy based on the one or more correlated string tokens.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

DETAILED DESCRIPTION

Figure 1:
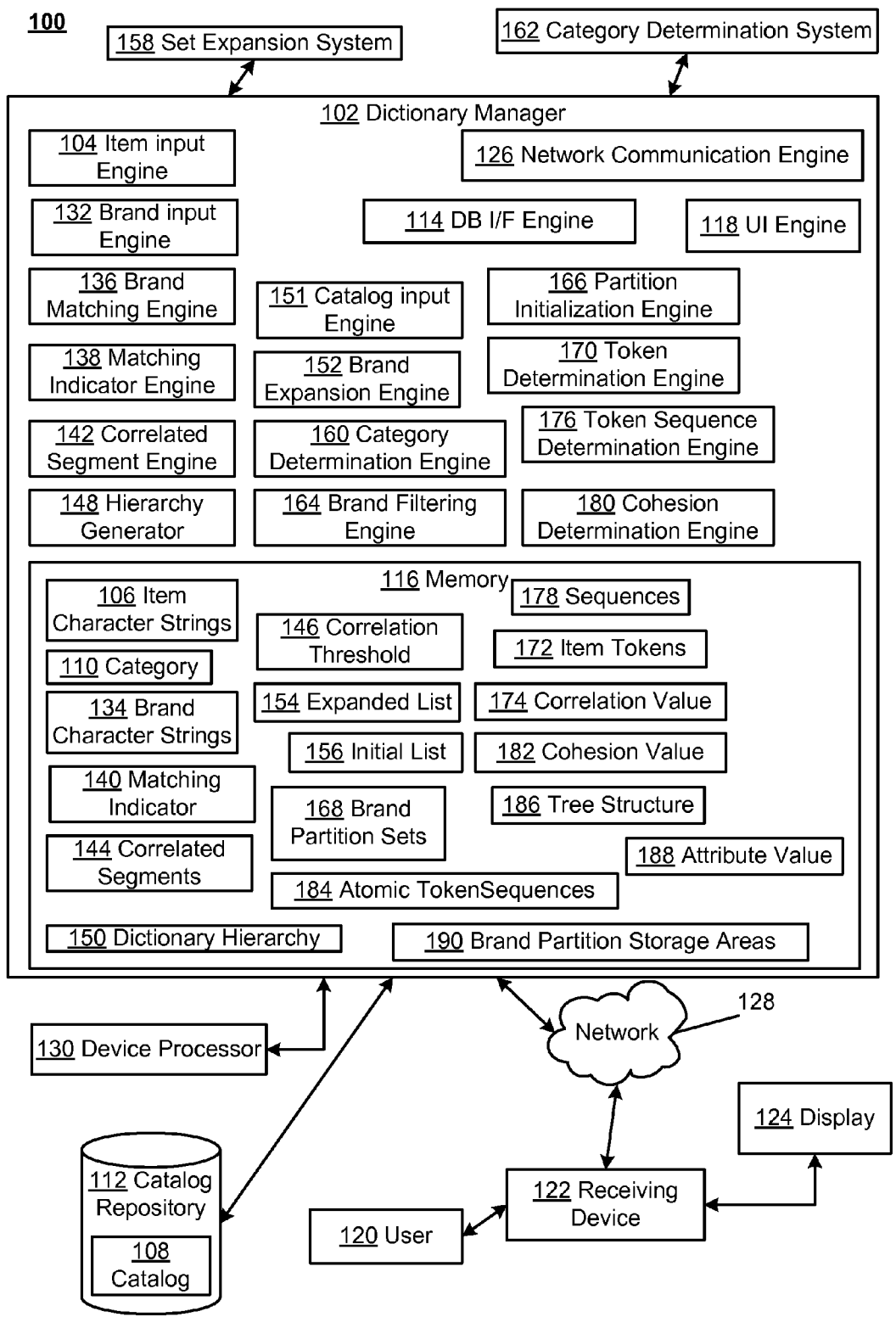
FIG. 1 is a block diagram of an example system for managing catalog dictionaries.

Many users of online services may utilize catalogs for research or shopping activities. The catalogs may include lists of many different types of items, and may include many different types of attributes associated with the various items. For example, a commercial catalog of products offered for sale may include brand names, model names or style names, make attributes, (e.g., TOYOTA TERCEL), and other features such as color, texture, or size. A category name may broadly identify the type of item (e.g., a camera, an automobile, a shirt), while a brand name may identify a source of the product (e.g., KODAK, TOYOTA, JNY).

Attributes associated with catalog items may be hierarchical in nature, such that the category may be associated with a top level, a brand may be associated with a second level (under the category), a make may be associated with a third level (under the brand), and a model may be associated with a fourth level (under the make). For example, there are many brands of automobiles (e.g., for automobile category). For example, a name of a model may identify its corresponding brand.

Catalog items may be stored as lists of character strings in online databases. The lists of strings may include many different features associated with each particular catalog item. Thus, a character string may represent an item for sale, and may include the features associated with the item. Searching such strings to find a particular desired item may be cumbersome if each string is to be parsed to find exact matches for a name of a desired item.

Example techniques discussed herein may provide dictionaries for hierarchical attributes based on data regularity in titles of catalog items (e.g., character strings of attributes associated with products).

Thus, categories (e.g., digital camera), attributes (e.g., brand, product line, model, resolution, optical zoom) and dictionaries (e.g., all distinct values of a specific attribute of a specific category) may be included as metadata in product catalogs used for electronic transactions. For example, (Fuji, Panasonic, Casio, . . . ) may be included in an example dictionary for a brand attribute of a digital camera category. For example, the availability of such information may provide opportunities for users to submit semantic queries such as "show me all the product items within digital camera category whose brand is Canon and whose resolution is greater than 10 Mega Pixels". Categories and attributes for online databases may be defined manually; however, many dictionaries may become so large that manual definition may become infeasible. For example, there exist thousands of distinct digital camera models in the marketplace; hence, manual dictionary generation may be infeasible.

It may be observed that many product items are associated with titles (as illustrated in Table 1 below) that may be simplistically interpreted as concatenations of their attribute values.

TABLE 1

Sample Titles of Digital Camera Product Items

| Item Title |
| --- |
| FUJI FINEPIX Z200FD 10.0 MEGAPIXEL DIGITAL CAMERA - SILVER |
| PANASONIC LUMIX DMC-FX33W 8.1 MEGAPIXEL 3.6X OPTICAL/4X DIGITAL ZOOM DIGITAL CAMERA (WHITE) |
| CASIO EXILIM ZOOM EX-Z300 DIGITAL CAMERA, 10.1 MEGAPIXEL, 4X OPTICAL ZOOM, 4X DIGITAL ZOOM, 3" LCD, PINK |
| PENTAX K20D 6.1 MEGAPIXEL SLR DIGITAL CAMERA W/PENTAX 18-250 F/3.5-6.3 LENS KIT |
| . . . |

For example, FINEPIX is a product line under the FUJI brand, and Z200FD is a model under the product line FINEPIX (as shown by the example catalog item represented by the first row entry of Table 1). Thus, a hierarchical relationship (Brand-ProductLine-Model) of the attributes brand, product line, and model may be manifested in item listings included in electronic catalogs.

According to an example embodiment, example techniques discussed herein may automatically generate dictionaries using such available product titles. As shown in Table 1 repetition and regularity may be utilized in generating the product titles, and these features may thus be leveraged in automatic dictionary generation.

Brand, product line and model may be used by manufacturers in many product lines, and may thus be found associated with many product categories. This type of attribute may offer a hierarchical relationship, indicated as Brand-ProductLine-Model.

According to an example embodiment, example systems for assigning a category to a product item and for expanding a set of brands based on several example brands using web data such as query logs may be used in preprocessing data as input to the example techniques discussed herein. For example, a set of brands may be expanded in accordance with example techniques as discussed in Yeye He et al, "SEISA: Set Expansion by Iterative Similarity Aggregation," WWW 2011, ACM, March 2011, Hyderabad, India.

According to an example embodiment, a set of inputs to example techniques as discussed herein may include:

(1) A predetermined category C (e.g., digital camera)

(2) A list of attributes $A(a_1, a_2, \ldots, a_n)$ identified as primary considerations for category C and the hierarchical relationship among the attributes. For example, the category digital camera may include attributes Brand, Product Line, Model, Resolution, Optical Zoom, Digital Zoom, and Digital Camera Type. For this example, the hierarchical relationship may be indicated as Brand-Product-Line-Model.

(3) All product items in the product catalog that are categorized as belonging to category C (4) Several examples for each attribute $a_i$ if $a_i$ does not participate in the hierarchical relationship (referred to herein as a "flat" attribute) or if $a_i$ is the top of the hierarchy (e.g., brand). For example "resolution" may be indicated as a "flat" attribute.

(5) According to an example embodiment, examples may be provided for all the hierarchical attributes.

Table 1 below illustrates four examples of attributes indicated as "flat" attributes, with example values for each of the attributes shown.

TABLE 2

Examples of flat attributes and hierarchy top attributes

| Example | Attribute |
| --- | --- |
| FUJI | Brand |
| Nikon | Brand |
| 10.0 MEGAPIXELS | Resolution |
| Silver | Color |

TABLE 3

Examples of hierarchical attributes

| Brand | Product Line | Model |
| --- | --- | --- |
| FUJI | FINEPIX | Z200FD |

Table 3 above illustrates example values provided for all the hierarchical attributes Brand, Product Line, and Model, as discussed above.

According to an example embodiment, example techniques discussed herein may be used to generate a dictionary for hierarchical attributes. An example dictionary is illustrated below in Table 4.

TABLE 4

Output dictionary for hierarchical attributes

| Brand | Product Line | Model |
| --- | --- | --- |
| PANASONIC | LUMIX | DMC-FX33W |
|  |  | DMC-FZ5 |
| . . . |  |  |

According to an example embodiment, dictionaries for hierarchical attributes may be generated in accordance with example algorithms as shown below. A preprocessing technique that may be performed before a primary algorithm (Algorithm 1 below) may be indicated as Algorithm 0. An example Pre-processing Algorithm 0 as shown below more formally illustrates these example steps that may be performed for determining the dictionaries.

---
Pre-processing Algorithm 0
---
Algorithm 0: Pre-processing
1. Call an external technique to expand the list of brand values using the example values for the Brand attribute
2. Tokenize and normalize the product titles by applying the following transformation for each product title:
   a. Remove tokens where each character is a non-ascii character
   b. Remove non-ascii characters at the end of a token
   c. Merge of tokens/split of long tokens (for example SNAPSIGHTS ==> SNAP SIGHTS)
3. Filter the expanded brand list by their positions in item titles
---

According to an example embodiment, step 3 (e.g., filtering) of Algorithm 0 shown above may include the following:
(1) If a brand value returned by the external technique (step 1) is not included in any item title, remove it from the list of brand values.
(2) Generate a list of values indicated as trusted values, the list initialized as a list that includes the examples in the input discussed above
(3) For each remaining expanded value, collect its occurrence statistics, which may be indicated as:
   a) Count of product titles that contain the expanded value
   b) Count of product titles that start with the expanded value
   c) Count of product titles wherein the expanded value follows special tokens "BY" or "FROM"
   d) Count of product titles that include the expanded value and a value included in the trusted list The list items above indicated as b) and c) may be interpreted as positive occurrences and d) may be interpreted as a negative occurrence. According to an example embodiment, if an expanded value includes a percentage of positive occurrences that is above some threshold, then elevate it to the trusted list. If its negative occurrence percentage is above some threshold, remove it from the expanded list. Update the count in d) and repeat this step until none are added to trusted list and none are removed by performing the step.

According to an example embodiment, an example Algorithm 1 as shown below more formally illustrates example steps that may be performed for generating dictionaries for hierarchical attributes, as discussed below.

---
Algorithm 1
---
Algorithm 1: Algorithm to generate dictionary for hierarchical attributes
1. Create a partition using each brand as key
2. If a product title includes a match with brand b, add it to b's partition
3. For each partition
   a. For each title in the partition for brand b
      i. Extract segments correlated with b using algorithm 2
   b. Build dictionary hierarchy based on all correlated segments
---

As shown in Algorithm 1, partitions may be generated based on brands. According to an example embodiment, the product titles may be analyzed to determine whether a match (or approximate match) exists with one of the brands. If a match is determined, the title may be added to a partition associated with the matching brand. An analysis is then performed to determine correlated segments of the items in each partition with the brand associated with the partition. The dictionary may then be generated based on the correlated segments.

According to an example embodiment, an example Algorithm 2 as shown below more formally illustrates example steps that may be performed for extracting segments within a product title that are correlated with a brand, as discussed below.

---
Algorithm 2
---
Algorithm 2: Extract correlated segments within a product title
Input: A token title T as a sequence of tokens $[t_1 t_2 \ldots t_n]$, the partition key k (e.g., the brand)
1. Identify tokens $\{c_1, c_2, \ldots, c_m\}$ that highly correlate with k
2. Identify token sequences $\{o_1, o_2, \ldots\}$ that match values of other attributes using Algorithm 3
3. For the token sequence $t_j t_{j+1} \ldots t_q$ between $o_i$ and $o_{i+1}$,
   a. Initialize a list of sequence of tokens as $[o_i][t_j][t_{j+1}] \ldots [t_q][o_{i+1}]$,
   b. For each pair of adjacent sequences $o_i$ and $o_{i+1}$,
      i. Compute cohesion score for each pair of adjacent sequences $s_j$ and $s_{j+1}$
      ii. Select the pair with maximum cohesion $s_j$ and $s_{j+1}$, if the score is above a predetermined threshold then combine them as a new sequence $s'_j = [s_j s_{j+1}]$, otherwise break
   c. For each resulting sequence, if it contains any highly correlated token $\{c_1, c_2, \ldots, c_m\}$, then return it as a correlated segment
---

According to an example embodiment, a correlation of a token t with partition key k (e.g., the brand) may be indicated more formally as:

$$\text{Correlation}(t) = \text{Count(titles in partition that include } t\text{)}/\text{Count(titles that include } t\text{)} \quad (1)$$

For example, in an example product catalog, a partition PANASONIC may include 474 titles that include a token LUMIX, and a Digital Camera category may include 503 titles that include the token LUMIX. Thus, for partition PANASONIC, Correlation(LUMIX)=474/503=0.942.

According to an example embodiment, a cohesion of two sequences $s_j$ and $s_{j+1}$ may be indicated more formally as:

$$\text{Cohesion}(s_j, s_{j+1}) = \text{Max}\{\text{Count(titles that include } s_j s_{j+1}\text{)}/\text{Count(titles that include } s_j\text{)}, \text{Count(titles that include } s_j s_{j+1}\text{)}/\text{Count(titles that include } s_{j+1}\text{)}\} \quad (2)$$

For example, in the example product catalog, 494 titles may include LUMIX DMC, 503 titles may include LUMIX, and 526 titles may include DMC; thus, Cohesion(LUMIX, DMC)=Max(494/503, 494/526)=0.982.

According to an example embodiment, Algorithm 2 may greedily combine tokens with high cohesion scores into a high cohesion phrase. If the resulting phrase includes a high correlation token, then that phrase may be returned as a correlated segment.

An example run for a title "PANASONIC LUMIX DMC-FX33W 8.1 MEGAPIXEL 3.6× OPTICAL/4× DIGITAL ZOOM DIGITAL CAMERA (WHITE)" may proceed through the example algorithms as follows:

Input may include a sequence of tokens [PANASONIC, LUMIX, DMC, -, FX33W, 8.1, MEGAPIXEL, 3.6×, OPTICAL, /, 4×, DIGITAL, ZOOM, DIGITAL, CAMERA, (, WHITE,)]

1. LUMIX, DMC, FX33W may be determined as high correlated tokens

2. PANASONIC matches Brand and 8.1 MEGAPIXEL matches Resolution (e.g., using algorithm 5), so these attributes may mark the boundary of a segment to be analyzed.

3. In segment [PANASONIC, LUMIX, DMC, -, FX33W, 8.1, MEGAPIXEL], hyphen—may be recognized as a special token and ignored in the counting; that is, the count for DMC-FX33W may include the sum of count (DMC-FX33W) plus count(DMC FX33W). A highest cohesion score may be determined as between DMC and FX33W (which equals 1.0), so combine DMC and FX33W, and the segment is [PANASONIC, LUMIX, DMC-FX33W, 8.1, MEGAPIXEL]. For this situation, the cohesion between LUMIX and DMC-FX33W is the highest, so LUMIX and DMC-FX33W may be combined next, resulting in a segment [PANASONIC, LUMIX DMC-FX33W, 8.1, MEGAPIXEL]. The algorithm may now terminate and return the segment LUMIX DMC-FX33W.

According to an example embodiment, all segments returned by Algorithm 2 may be filtered as discussed below.

For each segment, its occurrences after the tokens "WITH" and "FOR", or its occurrences outside a 2-token window around the partition key (e.g., brand), may be counted. If the percentage of such occurrences is above a predetermined threshold, the segment may be deemed low confidence and may be discarded. For example, segment NIKKOR is highly correlated with brand NIKON, but most occurrences of segment NIKKOR may occur after WITH (e.g., NIKON D200 10.2 MEGAPIXEL SLR CAMERA WITH NIKKOR LENS KIT), so NIKKOR may be filtered out and discarded.

According to an example embodiment, an example Algorithm 3 as shown below more formally illustrates example steps that may be performed for identifying token sequences in a product title that match values of other attributes, as discussed below. For example, Algorithm 3 may be used to identify token sequences in a product title that match values of other flat attributes not included in a Brand hierarchy.

| Algorithm 3 |
| --- |
| Algorithm 3: Identify token sequences in a product title that match values of other attributes |
| 1. For each flat attribute |
|    a. if its example values all include digits, call algorithm 4 |
|    b. else call algorithm 5 |

According to an example embodiment, an example Algorithm 4 may be used to match example values from a flat attribute which form alpha-digit patterns (e.g., "10.0 MEGAPIXEL" for Resolution attribute), which may indicate a numeric attribute.

For example, "10.0 MEGAPIXEL" may be interpreted as a numeric value 10.0 with context "MEGAPIXEL" (which may refer to a measurement unit). According to an example embodiment, all the numeric values preceding MEGAPIXEL may be determined, retaining the frequent values such as 5.0, 7.2, 8.0, 12.1, etc. The frequent values may be understood as reliable numeric values associated with attribute Resolution. Frequent tokens after 5.0, 7.2, 8.0, 10.0, 12.1 may be determined, and may result in a determination of tokens MP, MEGA PIXELS, MPIX, etc.

According to an example embodiment, an added context MP, MEGA PIXELS, MPIX may be used in the matching, for matching the original context MEGAPIXEL approximately. According to an example embodiment, patterns may be established <numeric value> MEGAPIXEL, <numeric value> MPIX, etc., which may be used for matching values for the Resolution attribute.

According to an example embodiment, the context of a numeric value may not be limited to the following token. For example, an example value F/3.5 for the Aperture attribute may include F/ as its context.

An example Algorithm 4 as shown below more formally illustrates these example steps that may be performed for identifying token sequences in a product title that matches example numeric values.

| Algorithm 4 |
| --- |
| Algorithm 4: Identify token sequences in a product title that match example numeric values |
| 1. generate patterns from the example values by substituting digit into regex \d ; for example, "10.0 MEGAPIXEL" becomes "\d+[\.\d+] MEGAPIXEL", which indicates a sequence of digits, which may be followed by a '.' and then digits, followed by token "MEGAPIXEL" |
| 2. Match titles with these patterns, keep the frequent matches; for example, match pattern "\d+[\.\d+] MEGAPIXEL" results in frequent matches {7.2 MEGAPIXEL, 10.0 MEGAPIXEL, 8.0 MEGAPIXEL, ... } |
| 3. For the numeric parts in the frequent matches, (e.g., {7.2, 10.0, 8.0, ... }), find all of their occurrences in the titles |
| 4. For each occurrence found in step 3 |
|    a. Approximate match the tokens in the same position as the non-numeric part of the pattern (e.g., 7.2 MEGAPIX is a match because 7.2 is the numeric part of a frequent match and MEGAPIX is an approximate match for MEGAPIXEL, as is 10.0MP). |
|    b. If the approximate match succeeds, generate a new pattern from the match (e.g., 10.0MP may generate a new pattern ""\d+[\.\d+]MP") |
| 5. Repeat steps 2, 3, 4 until no new pattern is generated |
| 6. For any token sequence in the product title that matches any of the patterns generated in steps 1-5, return the product title as a match |

An example Algorithm 5 as shown below more formally illustrates these example steps that may be performed for identifying token sequences in a product title that match non-numeric example values. For example, Algorithm 5 may be used to match example values of an attribute which does not include alpha-digit patterns (e.g., the Color attribute for digital cameras).

| Algorithm 5 |
| --- |
| Algorithm 5: Identify token sequences in a product title that match non-numeric example values |
| 1. Identify tokens $\{c_1, c_2, \ldots, c_m\}$ in input title T that highly correlated with k as in Algorithm 3 |
| 2. If a token sequence in T is the same as any example value v, return it as a match |
| 3. If there exists another title T' that includes any example value v, and if there exists a sequence in T that may be indicated as $[t_i t_{i+1} \ldots t_{j-1} s t_{j+1} \ldots t_q]$ and a sequence in T' that may be indicated as $[t_i t_{i+1} \ldots t_{j-1} v t_{j+1} \ldots t_q]$, (i.e., T and T' are common except at the position of v, and if s and v at most differ by 1 in length, and $[t_i t_{i+1} \ldots t_{j-1}]$ or $[t_{j+1} \ldots t_q]$ includes k or any $c_i$, then $[t_i t_{i+1} \ldots t_{j-1}][t_{j+1} \ldots t_q]$ is determined as a context pattern, and if a context pattern is sufficiently frequent (based on a predetermined threshold), then return s in $[t_i t_{i+1} \ldots t_{j-1} s t_{j+1} \ldots t_q]$ as a match |

For example, an input to Algorithm 5 may include two product titles, "PANASONIC LUMIX DMC-FX33W 8.1 MEGAPIXEL 3.6× OPTICAL/4× DIGITAL ZOOM DIGITAL CAMERA (WHITE)" and "PANASONIC LUMIX DMC-FX33W 8.1 MEGAPIXEL 3.6× OPTICAL/4× DIGI- TAL ZOOM DIGITAL CAMERA (SILVER)". The common token sequence may be determined as PANASONIC LUMIX DMC-FX33W 8.1 MEGAPIXEL 3.6× OPTICAL/4× DIGITAL ZOOM DIGITAL CAMERA (_). Since the common token sequence includes brand PANASONIC and high correlated tokens LUMIX and DMC, it may be trusted as a context pattern. Therefore, WHITE may be returned as a match for the Color attribute.

According to an example embodiment, the last step of Algorithm 1 may generate a dictionary tree based on the highly correlated segments that may be determined using example algorithms as discussed below.

According to an example embodiment, an example Algorithm 6 as shown below more formally illustrates the example steps that may be performed for generating a dictionary hierarchy based on correlated segments of product titles.

---
Algorithm 6
---
Algorithm 6: Generate dictionary hierarchy based on correlated
  segments of product titles
  1. Break segments into smaller token sequences (e.g., referred to as
     atoms) using algorithm 7
  2. Arrange atoms into a tree using algorithm 8
  3. Assign an attribute label to the tree using algorithm 9
---

Generally, if two segments share a common prefix and/or suffix, they may be associated with a finer structure within a segment. Therefore, a smallest unit within a structure (which may be referred to as an atom) may be used for dissecting segments.

According to an example embodiment, an example Algorithm 7 as shown below more formally illustrates these example steps that may be performed for dividing segments into atoms.

---
Algorithm 7
---
Algorithm 7: Divide segments into atoms
Input: a list of segments of product titles
1.   Initialize a set of token sequence that include all the segments
     from input
2.   If two token sequences $s_1$ and $s_2$ share the longest prefix (or suffix)
     s, and if s is not included as an example value of dictionary
     hierarchy in the input, split them as
        s = shared prefix (or suffix),
        $r_1$ = remaining from $s_1$,
        $r_2$ = remaining from $s_2$
        Remove $s_1$ and $s_2$ from the set, add s, $r_1$ and $r_2$ to the set
---

According to an example embodiment, an example Algorithm 8 as shown below more formally illustrates example steps that may be performed for arranging atoms (e.g., as output from Algorithm 7) into a tree.

---
Algorithm 8
---
Algorithm 8: Arrange atoms into a tree
  1. Group atoms that share the same alpha-numeric pattern
     together, otherwise a single atom forms a group
  2. For each pair of groups $g_1$ and $g_2$,
     a. if the optional input indicates atom $a_1$ is ancestor of $a_2$
        where $a_1$ in $g_1$ and $a_2$ in $g_2$, assign $g_1$ as the ancestor of $g_2$
     b. Count
           $f_1$ = frequency($g_1$),
           $f_2$ = frequency($g_2$), ---
Algorithm 8 (continued)
---
           $f_{12}$ = frequency($g_1$ precedes $g_2$),
           $f_{21}$ = frequency($g_2$ precedes $g_1$)
        (rule 1) if $f_1 > f_2$ and $f_{12} > f_{21}$, then assign $g_1$ as the
        ancestor of $g_2$
           else (rule 2) if $f_{12} > c_1 \times f_{21}$ and $f_1 > c_2 \times f_2$ and $f_{12} > c_3$
        where $c_1$, $c_2$, $c_3$ are configurable constants, then assign $g_1$ as
        the ancestor of $g_2$
  3. Generate a tree of atoms such that atom $a_1$ is the parent of $a_2$
     where $a_1$ in $g_1$ and $a_2$ in $g_2$ if $g_1$ is ancestor of $g_2$ according to
     step 2, and all ancestors of $g_2$ are also ancestors of $g_1$
---

According to an example embodiment, the heuristics may capture the conventions in product titles that higher level attribute values (e.g., LUMIX) may occur more frequently than lower level attribute values (e.g., FX33), and higher level attribute values (e.g., LUMIX) may occur before lower level attribute values (e.g., FX33) in the character strings representing the titles. Therefore, rule 1 of Algorithm 8 may indicate that, for two atoms x and y, if x is more frequent than y and x more frequently precedes y, then x may be assigned as an ancestor of y.

Further, rule 2 of Algorithm 8 may indicate that, if x mostly precedes y, and if frequency(x) is more than a fraction of frequency(y), then the finding that x mostly precedes y may take precedence.

For example, Algorithm 7 may output 4 tokens LUMIX, DMC, FZ28K and FX33. Since FZ28K and FX33 share the same alpha-numeric pattern, they may form a group. Each of LUMIX and DMC may be indicated as groups by themselves. The frequencies indicated by Algorithm 8 may be determined as:

frequency({LUMIX})=503 frequency({DMC})=526 frequency({FZ28K,FX33})=13 frequency({LUMNIX}precedes{DMC})=473 frequency({DMC}precedes{LUMIX})=8 frequency({LUMIX}precedes{FZ28K,FX33})=12 frequency({DMC}precedes{FZ28K,FX33})=13 frequency({FZ28K,FX33}precedes{LUMIX})=0 frequency({FZ28K,FX33}precedes{DMC})=0

According to rule 1 of Algorithm 8, LUMIX may be assigned as an ancestor of {FZ28K, FX33} and DMC may be assigned as an ancestor of {FZ28K, FX33}. According to rule 2 of Algorithm 8, LUMIX may be assigned as an ancestor of DMC. An example graph illustrating these ancestor-descendent relationships is discussed below with regard to FIG. 5a.

Thus, Algorithm 8, step 3 may retain an ancestor-descendent edge x-y (e.g., DMC-FX33) as parent-child edges if y's ancestors are also x's ancestor (e.g., FX33's ancestor LUMIX is also an ancestor of DMC). A tree as discussed below with regard to FIG. 5b may be generated by step 3 of Algorithm 8.

According to an example embodiment, an example Algorithm 9 as shown below more formally illustrates the example steps that may be performed for assigning an attribute label to the tree of atoms.

Algorithm 9

Algorithm 9: Assign attribute label to the tree of atoms
1. The implicit root may be assigned the top level attribute (e.g., Brand)
2. If an atom a is included in the examples of dictionary tree from the input, assign the attribute as indicated by the example. All other atom a' from g where a is included in g are also assigned the same attribute label
3. If an atom a is a super sequence of an example from the input, assign the attribute as indicated by the example. All other atoms a' from g where a is included in g are also assigned the same attribute label
4. Atom a is assigned the next level attribute of that of its parent atom. All other atoms a' from g where a is included in g are also assigned the same attribute label.
5. If an atom a is assigned the last level attribute, then replace a with a set of nodes such that each new node corresponds to each path under a; the new atom representing the new node is indicated as the concatenation of the atoms along the path. Assign the last level attribute to all the new nodes.

In many cases, Algorithm 9 may assign the first level hierarchical attribute to tree nodes at the first level, the second level attribute to nodes at the second level, etc. For example, if the hierarchical attributes are indicated as Brand-Product-Line-Model, and the tree is structured as shown in FIG. 5b (discussed below), Algorithm 9 may assign PANASONIC as Brand, LUMIX as ProductLine, and DMC-FX33 and DMC-FZ28K as model. However, examples as input (e.g., step 2, 3) may lead to inconsistencies. For example, if Table 3 indicates FINEPIX as ProductLine, then FINEPIX may be assigned as ProductLine regardless of its level in the tree. Algorithm 9 may also assign a common attribute to atoms that share a common alpha-numeric pattern. For example, if Table 3 indicates Z200FD as a Model, then F10FD, F30, etc., may all be assigned as Models.

As further discussed herein, FIG. 1 is a block diagram of a system 100 for managing catalog dictionaries. As shown in FIG. 1, a system 100 may include a dictionary manager 102 that includes an item input engine 104 configured to obtain a plurality of item character strings 106, each item character string representing an item in a catalog 108, each item associated with a category 110.

According to an example embodiment, the dictionary manager 102 may be embodied via executable instructions that may be stored on a computer-readable storage medium, as discussed below. According to an example embodiment, the computer-readable storage medium may include any number of storage devices, and any number of storage media types, including distributed devices.

For example, a catalog repository 112 may include the catalog 108, and may be accessed via a database interface engine 114. One skilled in the art of data processing will appreciate that there are many techniques for storing repository information discussed herein, such as various types of database configurations (e.g., SQL SERVERS) and non-database configurations.

According to an example embodiment, the dictionary manager 102 may include a memory 116 that may store the plurality of item character strings 106. In this context, a "memory" may include a single memory device or multiple memory devices configured to store data and/or instructions. Further, the memory 116 may span multiple distributed storage devices.

According to an example embodiment, a user interface engine 118 may be configured to manage communications between a user 120 and the dictionary manager 102. The user 120 may be associated with a receiving device 122 that may be associated with a display 124 and other input/output devices. For example, the display 124 may be configured to communicate with the receiving device 122, via internal device bus communications, or via at least one network connection. For example, the user 120 may provide input via an input device associated with the receiving device 122 (e.g., a keyboard, touchpad, touchscreen, mouse click, audio input device for receiving voice input).

According to an example embodiment, the dictionary manager 102 may include a network communication engine 126 configured to manage network communication between the dictionary manager 102 and other entities that may communicate with the dictionary manager 102 via at least one network 128. For example, the at least one network 128 may include at least one of the Internet, at least one wireless network, or at least one wired network. For example, the at least one network 128 may include a cellular network, a radio network, or any type of network that may support transmission of data for the dictionary manager 102. For example, the network communication engine 126 may manage network communications between the dictionary manager 102 and the receiving device 122. For example, the network communication engine 126 may manage network communication between the user interface engine 118 and the receiving device 122.

According to an example embodiment, instructions associated with the dictionary manager 102 may be stored on computer-readable media, and may be executed, for example, via a device processor 130, as discussed further below.

In this context, a "processor" may include a single processor or multiple processors configured to process instructions associated with a processing system. A processor may thus include multiple processors processing instructions in parallel and/or in a distributed manner. Although the device processor 130 is depicted as external to the dictionary manager 102 in FIG. 1, one skilled in the art of data processing will appreciate that the device processor 130 may be implemented as a single component, and/or as distributed units which may be located internally or externally to the dictionary manager 102, and/or any of its elements.

A brand input engine 132 may be configured to obtain a plurality of brand character strings 134 associated with the category 110.

A brand matching engine 136 may be configured to determine, for each item character string included in the plurality of item character strings 106, whether a matched substring of the each item character string represents a match with one of the obtained brand character strings 134.

A matching indicator engine 138 may be configured to generate a matching indicator 140 indicating that the each item character string includes a match with the one of the obtained brand character strings 134, based on a match result of the matching determination by the brand matching engine 136.

A correlated segment engine 142 may be configured to obtain, for each one of the obtained brand character strings 134, and for each one of the item character strings 106 that includes a match with the each one of the obtained brand character strings 134, one or more correlated segments 144, other than the matched substring, of the each one of the item character strings 106 that includes a match with the each one of the obtained brand character strings 134, based on determining that the obtained correlated segments 144 are correlated, greater than a predetermined correlation threshold 146, with the each one of the obtained brand character strings 134.

A hierarchy generator 148 may be configured to generate a dictionary hierarchy 150 based on the obtained correlated segments 144.

In this context, a "dictionary" may refer to a comprehensive listing of values associated with respective attributes associated with items that may be included in a database, or catalog. For example, the dictionary may be consulted to determine whether a particular character string includes a valid value of a particular attribute (ie., validity determined by the dictionary content).

According to an example embodiment, a catalog input engine 151 may be configured to obtain the catalog 108, the catalog 108 including a list of items represented by item character strings.

According to an example embodiment, a brand expansion engine 152 may be configured to request an expanded list 154 of brand values based on an initial list 156 of brand values associated with the category 110.

For example, the brand expansion engine 152 may request the expanded list 154 of brand values from a set expansion system 158 implemented in accordance with those discussed in Yeye He et al, "SEISA: Set Expansion by Iterative Similarity Aggregation," WWW 2011, ACM, March 2011, Hyderabad, India.

According to an example embodiment, a category determination engine 160 may be configured to request a determination of the category 110 associated with the plurality of item character strings 106. For example, a category determination system 162 may provide the determination of the category 110.

According to an example embodiment, the item input engine 104 may be configured to obtain the plurality of item character strings 106, each item character string representing an item in the catalog 108, each item associated with the category 110, based on the determination of the category 110 determined by the category determination engine 160.

According to an example embodiment, each one of the plurality of item character strings 106 may be associated with one or more of a product included in a product catalog or an item included in an enumerated list of items included in a group of items.

According to an example embodiment, a brand filtering engine 164 may be configured to filter the expanded list 154 of brand values based on positions of each brand value represented as a substring in groups of the plurality of item character strings 106.

According to an example embodiment, a partition initialization engine 166 may be configured to initialize a plurality of brand partition sets 168, each brand partition set associated with one of the obtained brand character strings 134.

According to an example embodiment, the matching indicator engine 138 may be configured to generate the matching indicator 140 based on updating the brand partition set 168 associated with the one of the obtained brand character strings 134 that matches the matched substring to indicate an addition of the item associated with the each item character string, based on a match result of the matching determination by the brand matching engine 136.

According to an example embodiment, a token determination engine 170 may be configured to determine a respective plurality of item tokens 172 associated with each respective one of the plurality of item character strings 106.

According to an example embodiment, the correlated segment engine 142 may be configured to determine a correlation value 174 associated with each one of the tokens 172, based on determining a correlation of the each one of the tokens 172 with the brand character string associated with the brand partition set that includes the item associated with the item character string that includes the each one of the tokens.

According to an example embodiment, the correlated segment engine 142 may be configured to determine the correlation value 174 associated with the each one of the tokens 172, based on a comparison of a number of item character strings that are associated with the brand partition set that includes the item associated with the item character string that includes the each one of the tokens, and that include the one of the tokens, and a number of item character strings that include the one of the tokens.

According to an example embodiment, a token sequence determination engine 176 may be configured to determine sequences 178 of tokens included in the each respective one of the plurality of item character strings 106, the sequences 178 of tokens matching values of attributes associated with the items represented by the plurality of item character strings 106.

According to an example embodiment, a cohesion determination engine 180 may be configured to determine a cohesion value 182 associated with adjacent sequences of tokens included in the each respective one of the plurality of item character strings 106.

According to an example embodiment, the hierarchy generator 148 may be configured to generate the dictionary hierarchy 150 based on obtaining atomic token sequences 184 based on the obtained correlated segments, updating a tree structure 186 based on the obtained atomic sequences 184, and assigning an attribute value 188 to the tree structure 186.

According to an example embodiment, the tree structure 186 may be based on a hierarchical arrangement associated with a hierarchy that is associated with hierarchical attributes associated with the category 110 and the catalog 108, each of the attributes included as one or more substrings of one or more of the plurality of item character strings 106.

According to an example embodiment, the partition initialization engine 166 may be configured to determine a plurality of brand partition storage areas 190, each brand partition storage area 190 associated with one of the obtained brand character strings 134.

According to an example embodiment, the matching indicator engine 138 may be configured to store the each item character string in the brand partition storage area 190 associated with one of the obtained brand character strings 134 that matches the matched substring, based on a result of the matching determination by the brand matching engine 136.

Figure 2A:
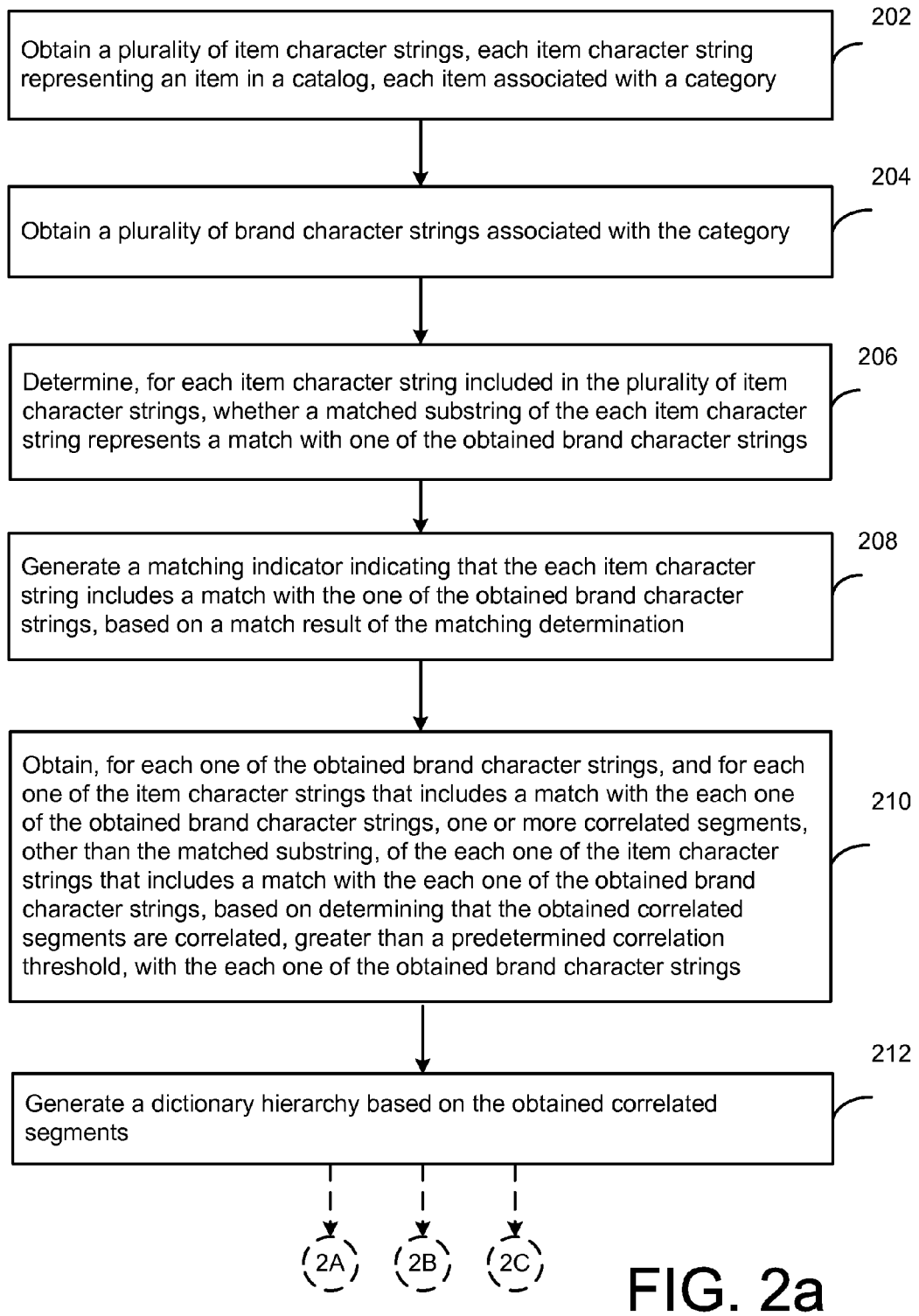
FIGS. 2a-2d are a flowchart illustrating example operations of the system of FIG. 1.
Figure 2B:
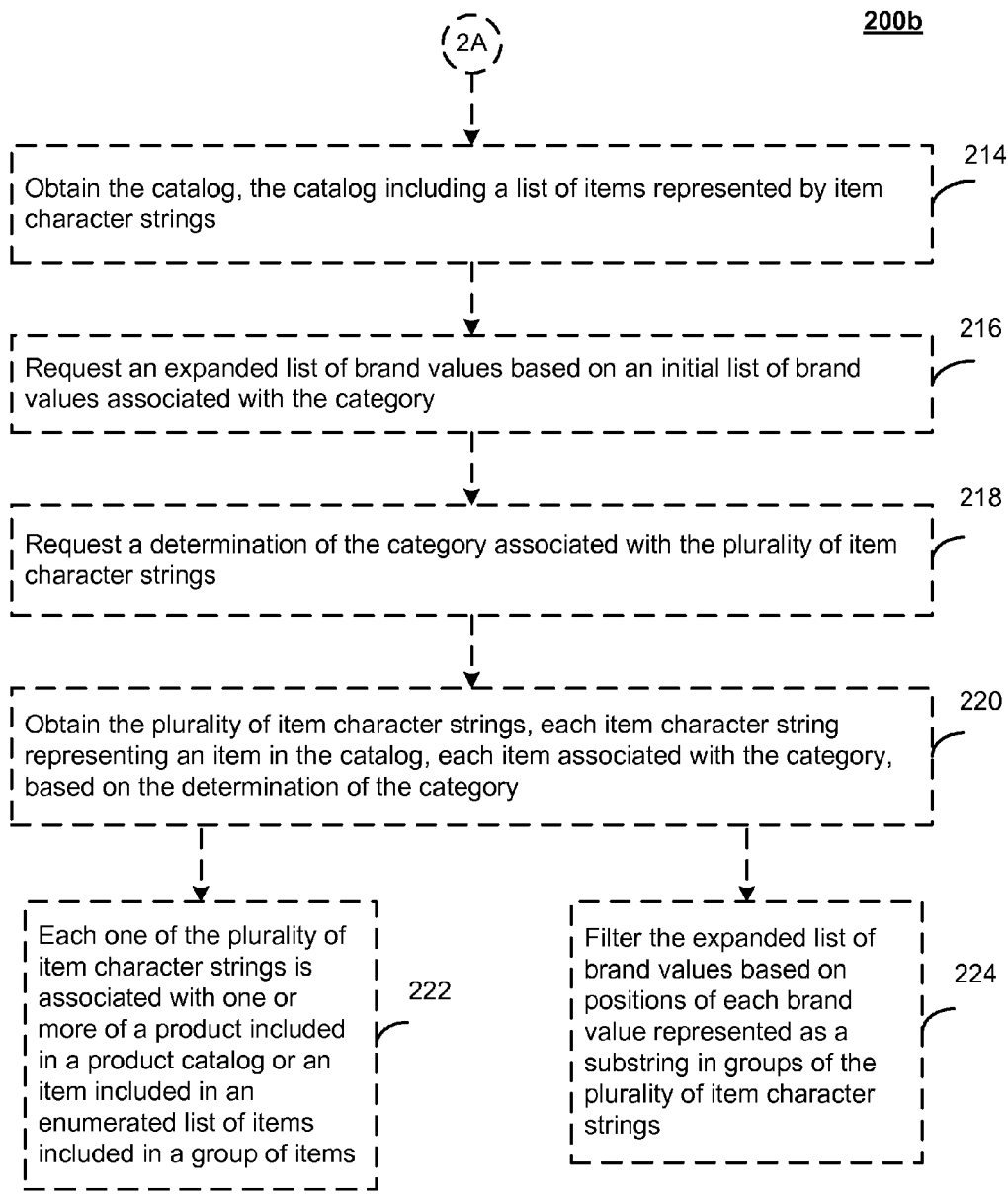
Figure 2C:
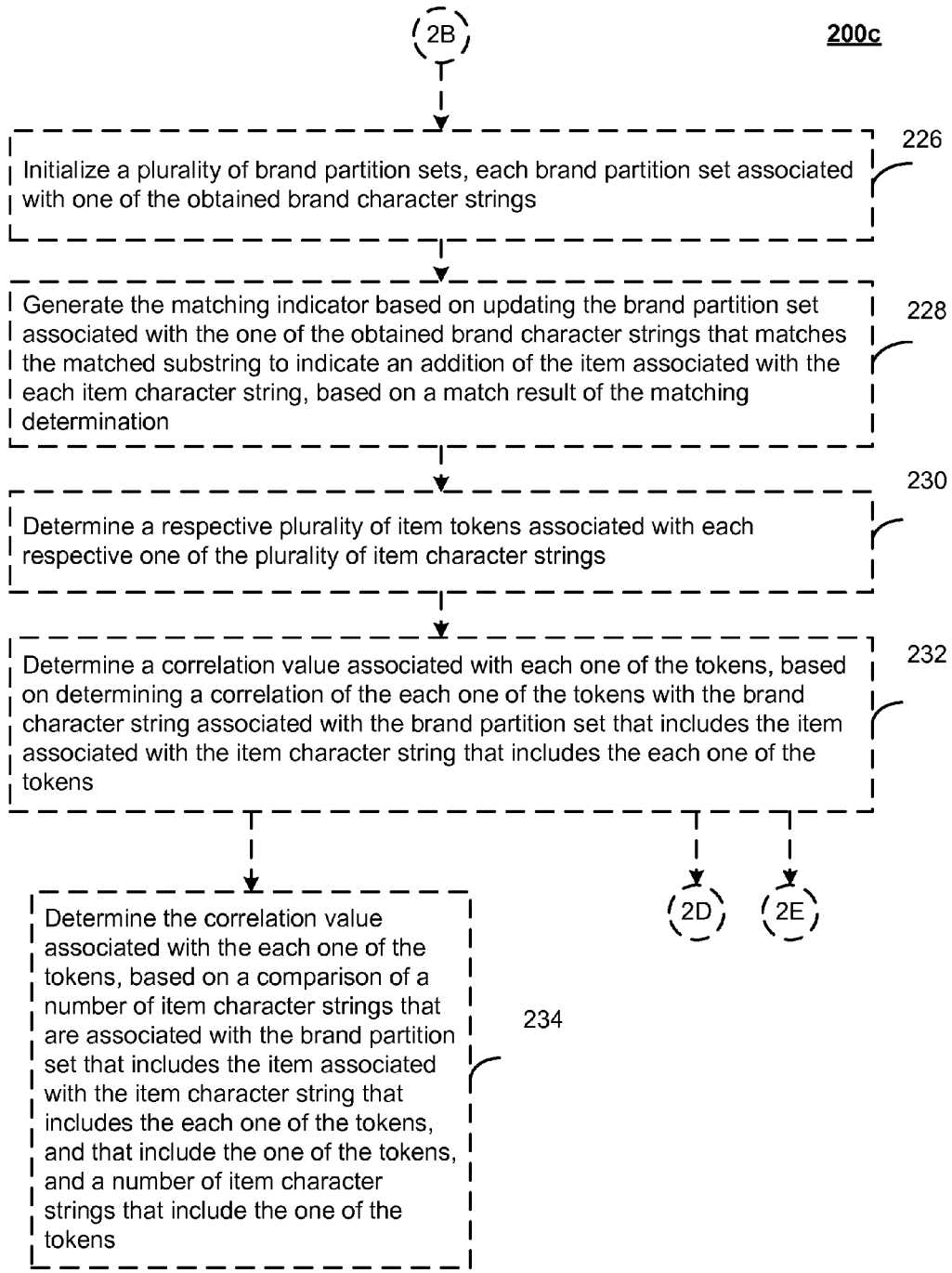
Figure 2D:
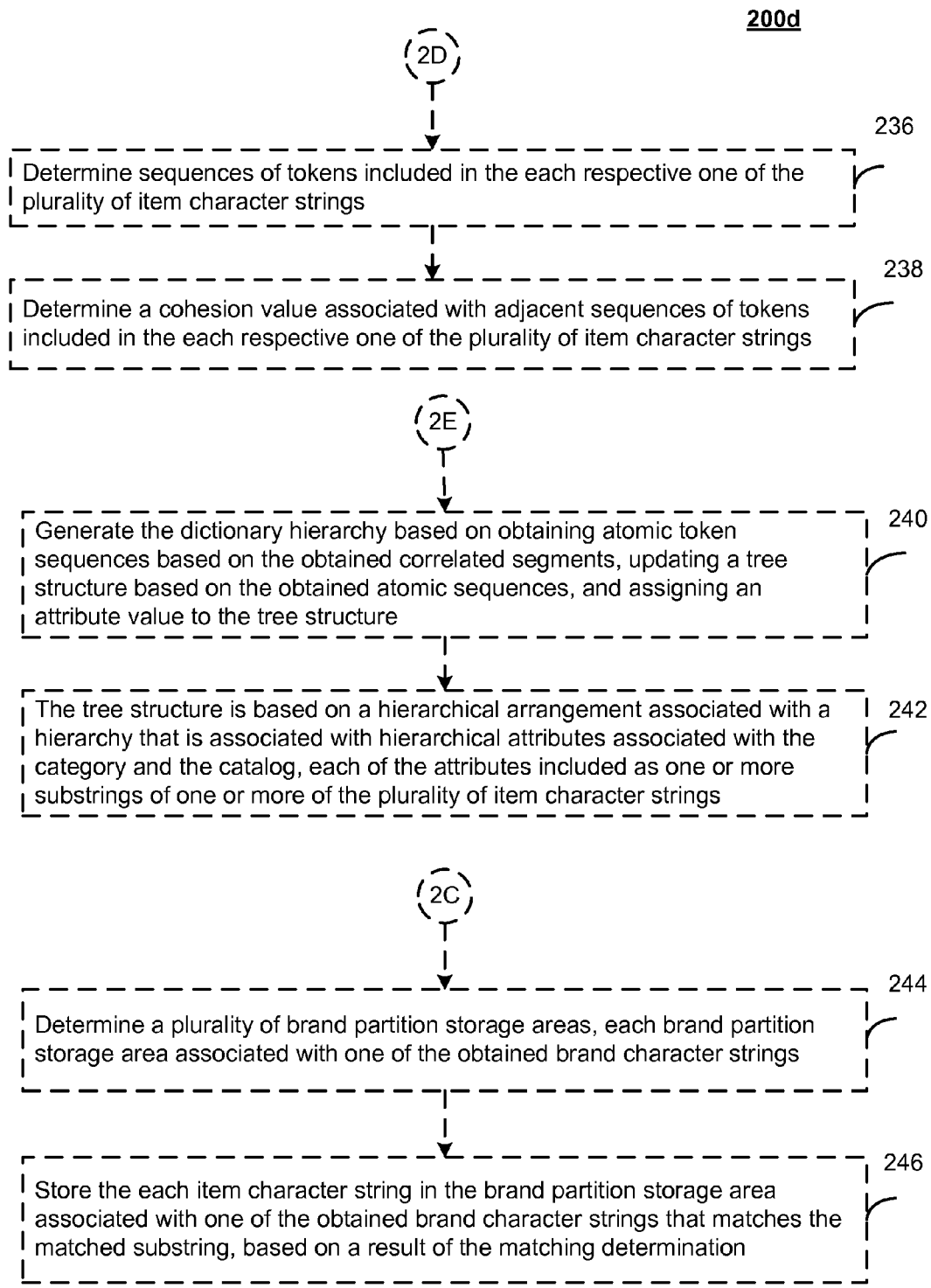

FIGS. 2a-2d are a flowchart illustrating example operations of the system of FIG. 1, according to example embodiments. In the example of FIG. 2a, a plurality of item character strings may be obtained, each item character string representing an item in a catalog, each item associated with a category (202). For example, the item input engine 104 may obtain the plurality of item character strings 106, each item character string representing an item in a catalog 108, each item associated with a category 110, as discussed above.

A plurality of brand character strings associated with the category may be obtained (204). For example, the brand input engine 132 may obtain the plurality of brand character strings 134 associated with the category 110, as discussed above.

It may be determined, for each item character string included in the plurality of item character strings, whether a matched substring of the each item character string represents a match with one of the obtained brand character strings (206). For example, the brand matching engine 136 may determine, for each item character string included in the plurality of item character strings 106, whether a matched substring of the each item character string represents a match with one of the obtained brand character strings 134, as discussed above.

A matching indicator indicating that the each item character string includes a match with the one of the obtained brand character strings may be generated, based on a match result of the matching determination (208). For example, the matching indicator engine 138 may generate a matching indicator 140 indicating that the each item character string includes a match with the one of the obtained brand character strings 134, based on a match result of the matching determination by the brand matching engine 136, as discussed above.

For each one of the obtained brand character strings, and for each one of the item character strings that includes a match with the each one of the obtained brand character strings, one or more correlated segments, other than the matched substring, of the each one of the item character strings that includes a match with the each one of the obtained brand character strings, may be obtained, based on determining that the obtained correlated segments are correlated, greater than a predetermined correlation threshold, with the each one of the obtained brand character strings (210). For example, the correlated segment engine 142 may obtain, for each one of the obtained brand character strings 134, and for each one of the item character strings 106 that includes a match with the each one of the obtained brand character strings 134, one or more correlated segments 144, other than the matched substring, of the each one of the item character strings 106 that includes a match with the each one of the obtained brand character strings 134, based on determining that the obtained correlated segments 144 are correlated, greater than a predetermined correlation threshold 146, with the each one of the obtained brand character strings 134, as discussed above.

A dictionary hierarchy may be generated based on the obtained correlated segments (212). For example, the hierarchy generator 148 may generate the dictionary hierarchy 150 based on the obtained correlated segments 144, as discussed above.

According to an example embodiment, the catalog may be obtained, the catalog including a list of items represented by item character strings (214). For example, the catalog input engine 151 may obtain the catalog 108, as discussed above.

According to an example embodiment, an expanded list of brand values may be requested based on an initial list of brand values associated with the category (216). For example, the brand expansion engine 152 may request the expanded list 154 of brand values based on the initial list 156 of brand values associated with the category 110, as discussed above.

According to an example embodiment, a determination of the category associated with the plurality of item character strings may be requested (218). For example, the category determination engine 160 may request the determination of the category 110 associated with the plurality of item character strings 106, as discussed above.

According to an example embodiment, the plurality of item character strings may be obtained, each item character string representing an item in the catalog, each item associated with the category, based on the determination of the category (220). For example, the item input engine 104 may obtain the plurality of item character strings 106, each item character string representing an item in the catalog 108, each item associated with the category 110, based on the determination of the category determined by the category determination engine 160, as discussed above.

According to an example embodiment, each one of the plurality of item character strings may be associated with one or more of a product included in a product catalog or an item included in an enumerated list of items included in a group of items (222).

According to an example embodiment, the expanded list of brand values may be filtered based on positions of each brand value represented as a substring in groups of the plurality of item character strings (224). For example, the brand filtering engine 164 may filter the expanded list 154 of brand values based on positions of each brand value represented as a substring in groups of the plurality of item character strings 106, as discussed above.

According to an example embodiment, a plurality of brand partition sets may be initialized, each brand partition set associated with one of the obtained brand character strings (226). For example, the partition initialization engine 166 may initialize the plurality of brand partition sets 168, each brand partition set associated with one of the obtained brand character strings 134, as discussed above.

According to an example embodiment, the matching indicator may be generated based on updating the brand partition set associated with the one of the obtained brand character strings that matches the matched substring to indicate an addition of the item associated with the each item character string, based on a match result of the matching determination (228). For example, the matching indicator engine 138 may generate the matching indicator 140 based on updating the brand partition set 168 associated with the one of the obtained brand character strings 134 that matches the matched substring to indicate an addition of the item associated with the each item character string, based on a match result of the matching determination by the brand matching engine 136, as discussed above.

According to an example embodiment, a respective plurality of item tokens associated with each respective one of the plurality of item character strings may be determined (230). For example, the token determination engine 170 may determine the respective plurality of item tokens 172 associated with each respective one of the plurality of item character strings 106, as discussed above.

According to an example embodiment, a correlation value associated with each one of the tokens may be determined, based on determining a correlation of the each one of the tokens with the brand character string associated with the brand partition set that includes the item associated with the item character string that includes the each one of the tokens (232). For example, the correlated segment engine 142 may determine the correlation value 174 associated with each one of the tokens 172, based on determining a correlation of the each one of the tokens 172 with the brand character string associated with the brand partition set that includes the item associated with the item character string that includes the each one of the tokens, as discussed above.

According to an example embodiment, the correlation value associated with the each one of the tokens may be determined, based on a comparison of a number of item character strings that are associated with the brand partition set that includes the item associated with the item character string that includes the each one of the tokens, and that include the one of the tokens, and a number of item character strings that include the one of the tokens (234). For example, the correlated segment engine 142 may determine the correlation value 174 associated with the each one of the tokens 172, based on a comparison of a number of item character strings that are associated with the brand partition set that includes the item associated with the item character string that includes the each one of the tokens, and that include the one of the tokens, and a number of item character strings that include the one of the tokens, as discussed above.

According to an example embodiment, sequences of tokens included in the each respective one of the plurality of item character strings may be determined, the sequences of tokens matching values of attributes associated with the items represented by the plurality of item character strings (236). For example, the token sequence determination engine 176 may determine sequences 178 of tokens included in the each respective one of the plurality of item character strings 106, the sequences 178 of tokens matching values of attributes associated with the items represented by the plurality of item character strings 106, as discussed above.

According to an example embodiment, a cohesion value associated with adjacent sequences of tokens included in the each respective one of the plurality of item character strings may be determined (238). For example, the cohesion determination engine 180 may determine the cohesion value 182 associated with adjacent sequences of tokens included in the each respective one of the plurality of item character strings 106, as discussed above.

According to an example embodiment, the dictionary hierarchy may be generated based on obtaining atomic token sequences based on the obtained correlated segments, updating a tree structure based on the obtained atomic sequences, and assigning an attribute value to the tree structure (240). For example, the hierarchy generator 148 may generate the dictionary hierarchy 150 based on obtaining atomic token sequences 184 based on the obtained correlated segments, updating a tree structure 186 based on the obtained atomic sequences 184, and assigning an attribute value 188 to the tree structure 186, as discussed above.

According to an example embodiment, the tree structure may be based on a hierarchical arrangement associated with a hierarchy that is associated with hierarchical attributes associated with the category and the catalog, each of the attributes included as one or more substrings of one or more of the plurality of item character strings (242).

According to an example embodiment, a plurality of brand partition storage areas may be determined, each brand partition storage area associated with one of the obtained brand character strings (244). For example, the partition initialization engine 166 may determine the plurality of brand partition storage areas 190, each brand partition storage area 190 associated with one of the obtained brand character strings 134, as discussed above.

According to an example embodiment, the each item character string may be stored in the brand partition storage area associated with one of the obtained brand character strings that matches the matched substring, based on a result of the matching determination (246). For example, the matching indicator engine 138 may store the each item character string in the brand partition storage area 190 associated with one of the obtained brand character strings 134 that matches the matched substring, based on a result of the matching determination by the brand matching engine 136, as discussed above.

Figure 3A:
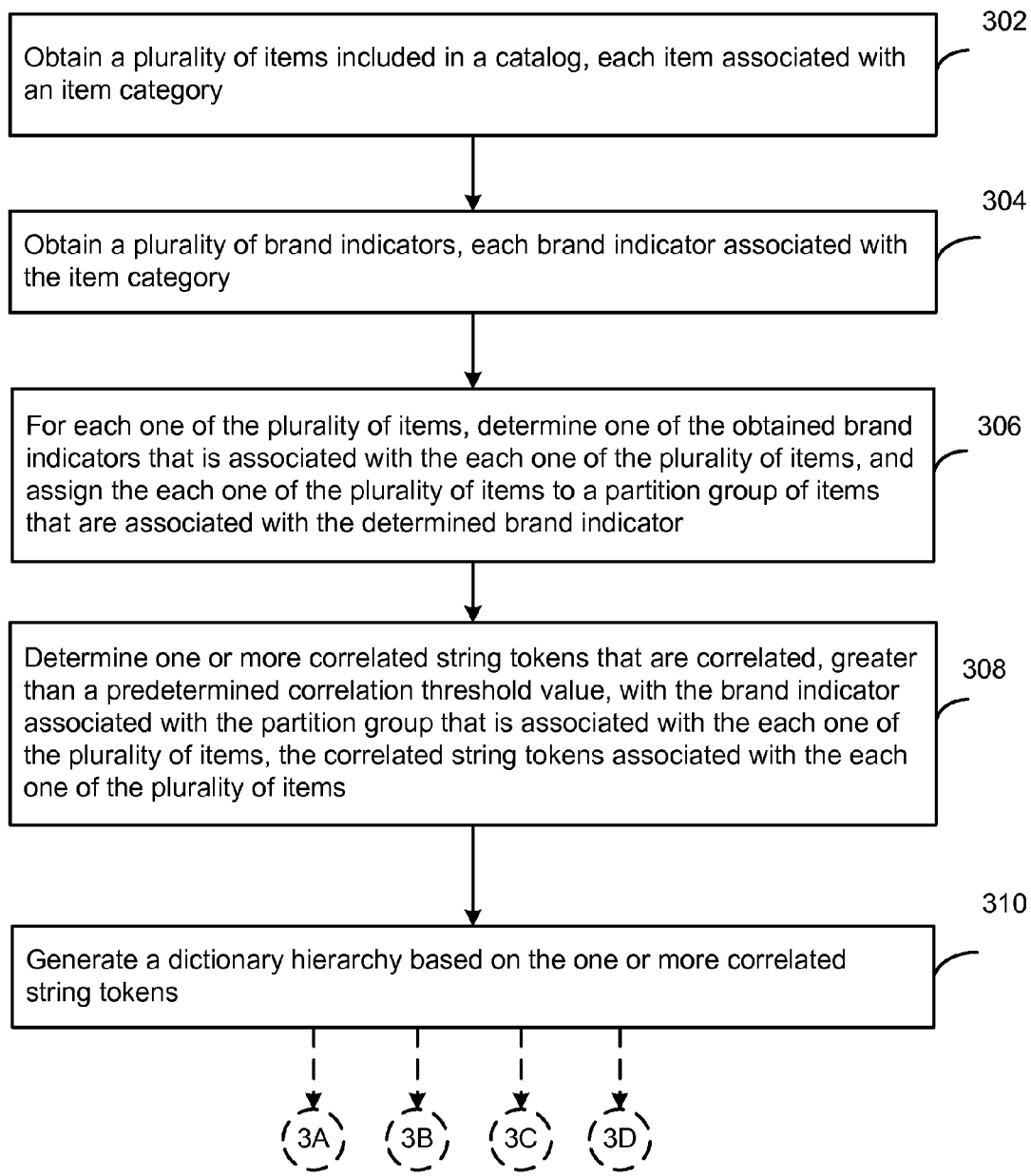
FIGS. 3a-3c are a flowchart illustrating example operations of the system of FIG. 1.
Figure 3B:
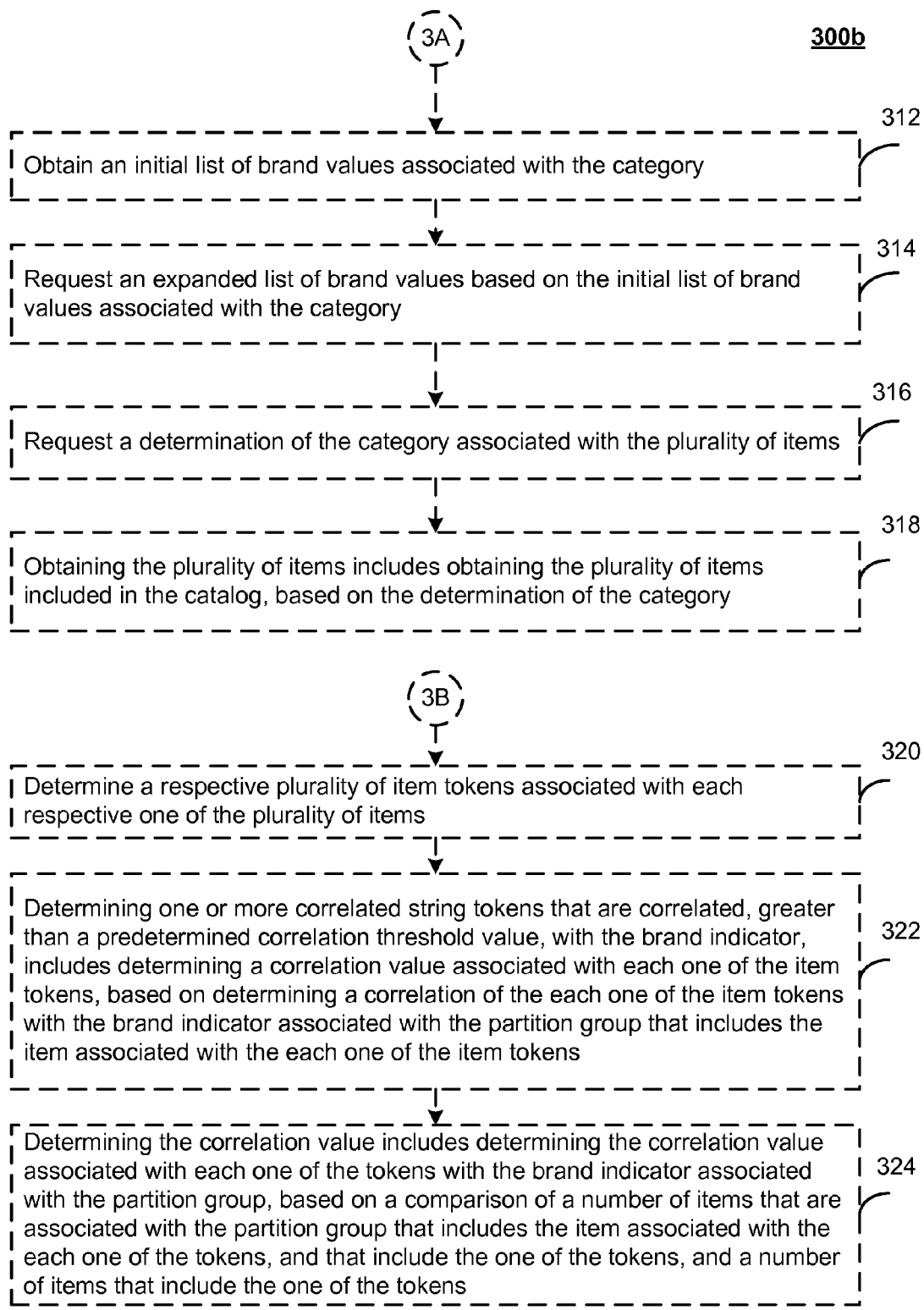
Figure 3C:
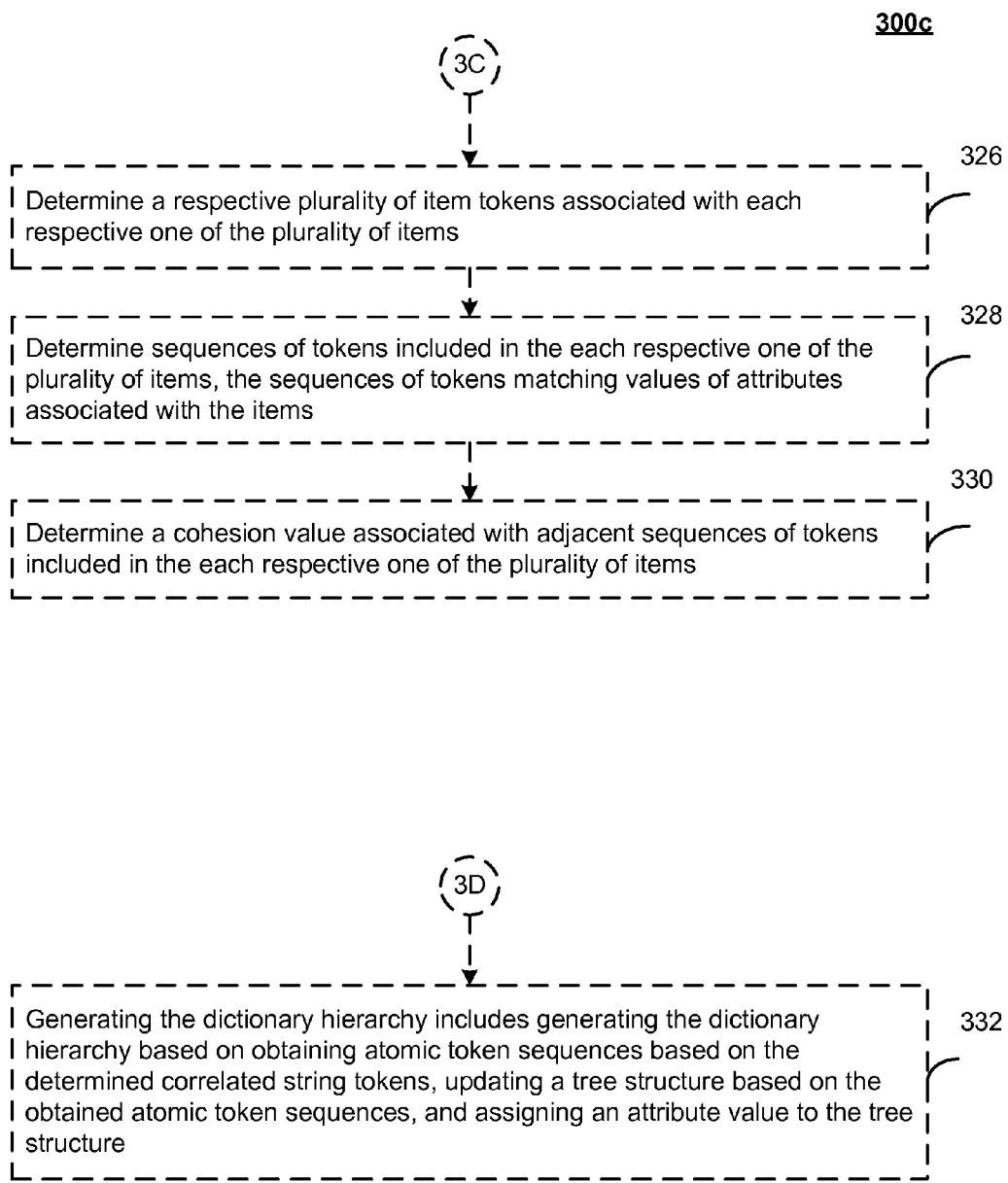

FIGS. 3a-3c are a flowchart illustrating example operations of the system of FIG. 1, according to example embodiments. In the example of FIG. 3a, a plurality of items included in a catalog may be obtained, each item associated with an item category (302). For example, the item input engine 104 may obtain the plurality of items included in the catalog, as discussed above.

A plurality of brand indicators may be obtained, each brand indicator associated with the item category (304). For example, the brand input engine 132 may obtain a plurality of brand indicators, each brand indicator associated with the item category.

For each one of the plurality of items, one of the obtained brand indicators that is associated with the each one of the plurality of items may be determined, and the each one of the plurality of items may be assigned to a partition group of items that are associated with the determined brand indicator (306).

One or more correlated string tokens that are correlated, greater than a predetermined correlation threshold value, with the brand indicator associated with the partition group that is associated with the each one of the plurality of items, may be determined, via a device processor, the correlated string tokens associated with the each one of the plurality of items (308). For example, the correlated segment engine 142 may determine a correlation value 174 associated with each one of the tokens 172, based on determining a correlation of the each one of the tokens 172 with the brand character string associated with the brand partition set that includes the item associated with the item character string that includes the each one of the tokens, as discussed above.

A dictionary hierarchy may be generated based on the one or more correlated string tokens (310). For example, the hierarchy generator 148 may generate the dictionary hierarchy 150 based on the obtained correlated segments 144, as discussed above.

According to an example embodiment, an initial list of brand values associated with the category may be obtained (312).

According to an example embodiment, an expanded list of brand values based on the initial list of brand values associated with the category may be requested (314). For example, the brand expansion engine 152 may request an expanded list 154 of brand values based on an initial list 156 of brand values associated with the category 110, as discussed above.

According to an example embodiment, a determination of the category associated with the plurality of items may be requested (316). For example, the category determination engine 160 may request a determination of the category 110 associated with the plurality of item character strings 106, as discussed above.

According to an example embodiment, the obtaining the plurality of items may include obtaining the plurality of items included in the catalog, based on the determination of the category (318).

According to an example embodiment, a respective plurality of item tokens associated with each respective one of the plurality of items may be determined (320). For example, the token determination engine 170 may determine the respective plurality of item tokens 172 associated with each respective one of the plurality of item character strings 106, as discussed above.

According to an example embodiment, the determining one or more correlated string tokens that are correlated, greater than a predetermined correlation threshold value, with the brand indicator, may include determining a correlation value associated with each one of the item tokens, based on determining a correlation of the each one of the item tokens with the brand indicator associated with the partition group that includes the item associated with the each one of the item tokens (322).

According to an example embodiment, the determining the correlation value may include determining the correlation value associated with each one of the tokens with the brand indicator associated with the partition group, based on a comparison of a number of items that are associated with the partition group that includes the item associated with the each one of the tokens, and that include the one of the tokens, and a number of items that include the one of the tokens (324).

According to an example embodiment, a respective plurality of item tokens associated with each respective one of the plurality of items may be determined (326). For example, the token determination engine 170 may determine the respective plurality of item tokens 172 associated with each respective one of the plurality of item character strings 106, as discussed above.

According to an example embodiment, sequences of tokens included in the each respective one of the plurality of items may be determined, the sequences of tokens matching values of attributes associated with the items (328). For example, the token sequence determination engine 176 may determine sequences 178 of tokens included in the each respective one of the plurality of item character strings 106, the sequences 178 of tokens matching values of attributes associated with the items represented by the plurality of item character strings 106, as discussed above.

According to an example embodiment, a cohesion value associated with adjacent sequences of tokens included in the each respective one of the plurality of items may be determined (330). For example, the cohesion determination engine 180 may determine the cohesion value 182 associated with adjacent sequences of tokens included in the each respective one of the plurality of item character strings 106, as discussed above.

According to an example embodiment, generating the dictionary hierarchy may include generating the dictionary hierarchy based on obtaining atomic token sequences based on the determined correlated string tokens, updating a tree structure based on the obtained atomic token sequences, and assigning an attribute value to the tree structure (332). For example, the hierarchy generator 148 may generate the dictionary hierarchy 150 based on obtaining atomic token sequences 184 based on the obtained correlated segments, updating a tree structure 186 based on the obtained atomic sequences 184, and assigning an attribute value 188 to the tree structure 186, as discussed above.

Figure 4A:
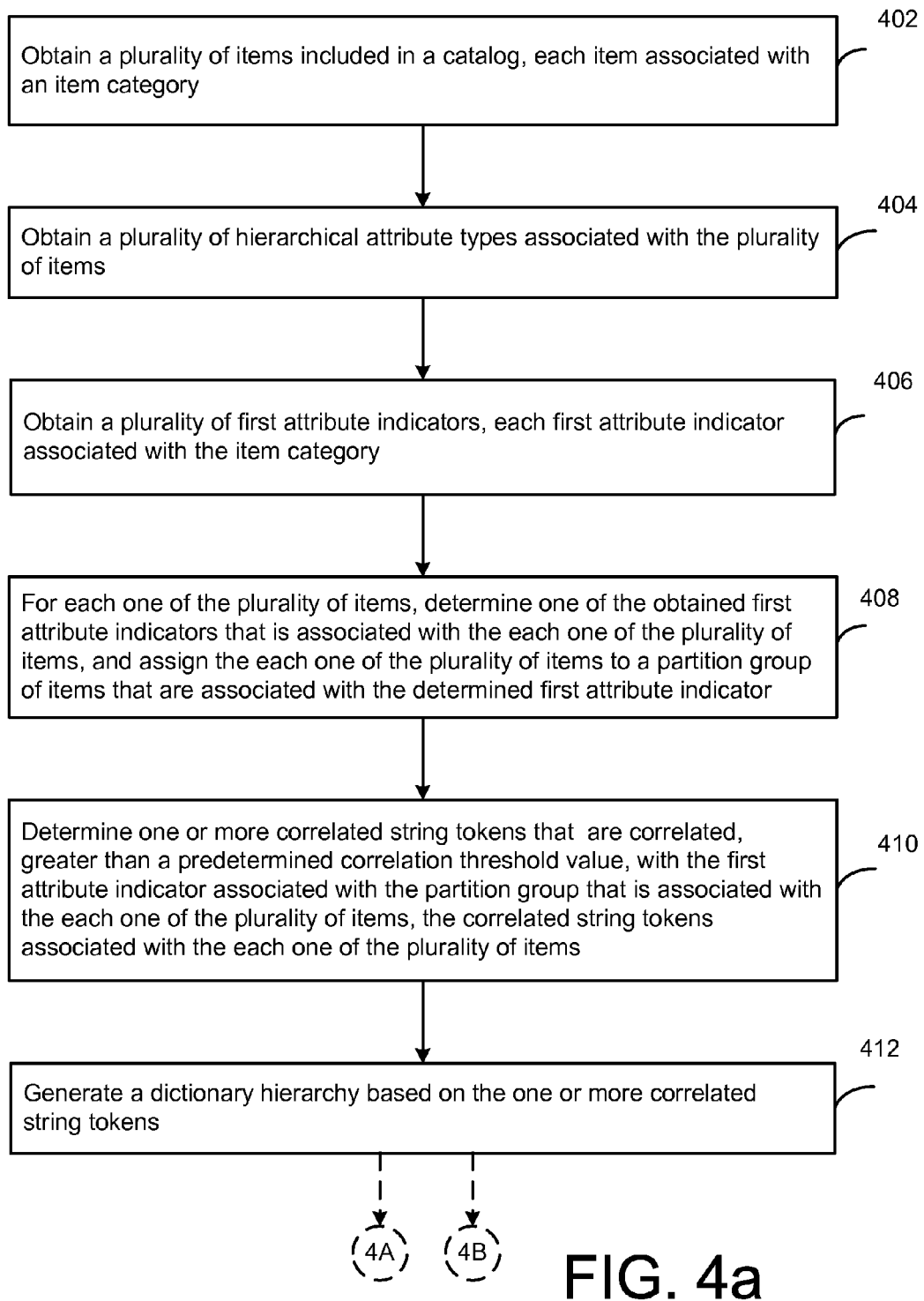
FIGS. 4a-4b are a flowchart illustrating example operations of the system of FIG. 1.
Figure 4B:
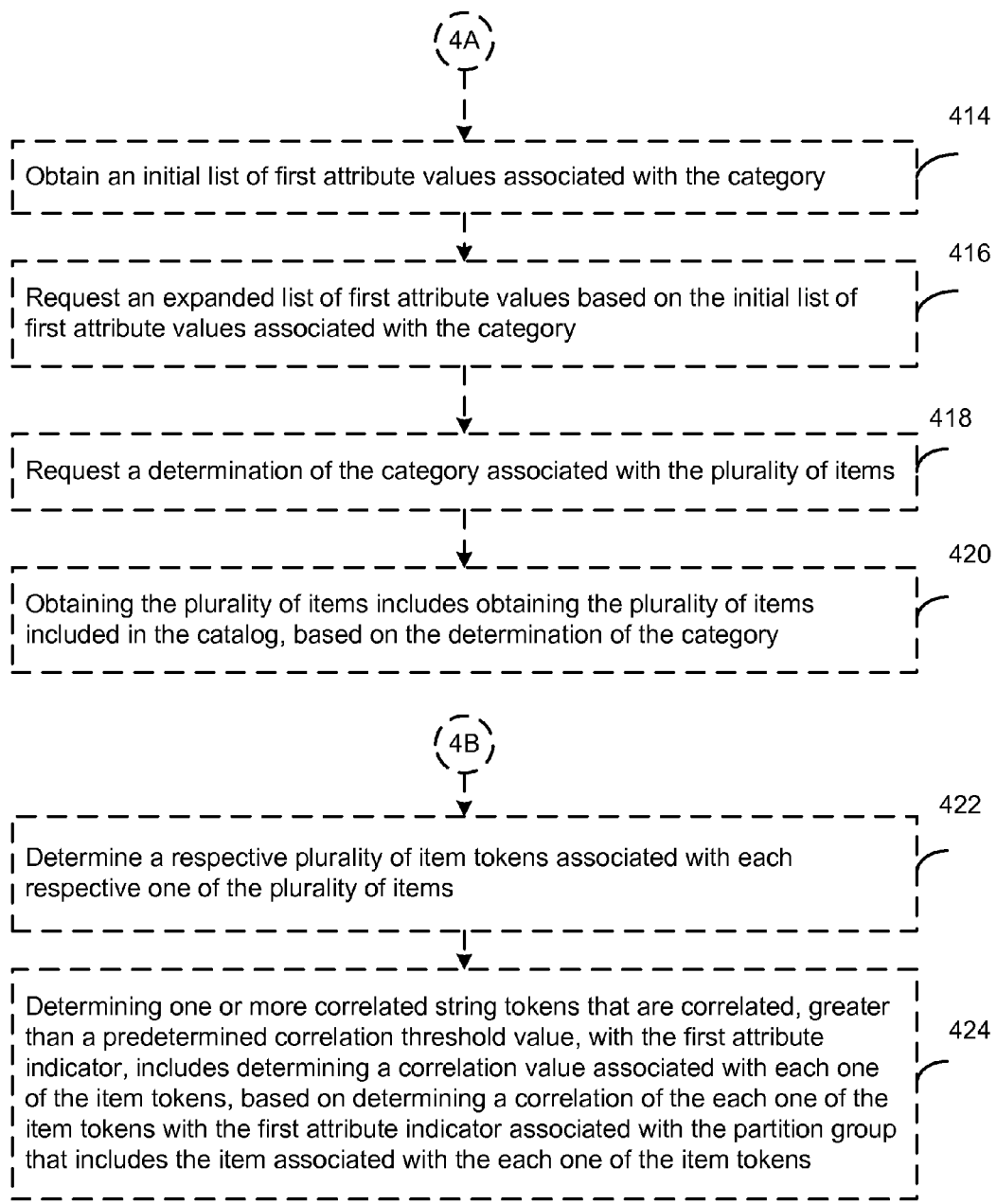

FIGS. 4a-4b are a flowchart illustrating example operations of the system of FIG. 1, according to example embodiments. In the example of FIG. 4a, a plurality of items included in a catalog may be obtained, each item associated with an item category (402). For example, the item input engine 104 may obtain the plurality of item character strings 106, each item character string representing an item in the catalog 108, each item associated with the category 110, based on the determination of the category 110 determined by the category determination engine 160, as discussed above.

A plurality of hierarchical attribute types associated with the plurality of items may be obtained (404). A plurality of first attribute indicators may be obtained, each first attribute indicator associated with the item category (406).

For each one of the plurality of items, one of the obtained first attribute indicators that is associated with the each one of the plurality of items may be determined, and the each one of the plurality of items may be assigned to a partition group of items that are associated with the determined first attribute indicator (408).

One or more correlated string tokens that are correlated, greater than a predetermined correlation threshold value, with the first attribute indicator associated with the partition group that is associated with the each one of the plurality of items may be determined, the correlated string tokens associated with the each one of the plurality of items (410). A dictionary hierarchy may be generated based on the one or more correlated string tokens (412).

According to an example embodiment, an initial list of first attribute values associated with the category may be obtained (414).

According to an example embodiment, an expanded list of first attribute values based on the initial list of first attribute values associated with the category may be requested (416). For example, the brand expansion engine 152 may request an expanded list 154 of brand values based on an initial list 156 of brand values associated with the category 110, as discussed above.

According to an example embodiment, a determination of the category associated with the plurality of items may be requested (418). For example, the category determination engine 160 may request a determination of the category 110 associated with the plurality of item character strings 106, as discussed above.

According to an example embodiment, the obtaining the plurality of items may include obtaining the plurality of items included in the catalog, based on the determination of the category (420).

According to an example embodiment, determine a respective plurality of item tokens associated with each respective one of the plurality of items may be determined (422).

According to an example embodiment, the determining one or more correlated string tokens that are correlated, greater than a predetermined correlation threshold value, with the first attribute indicator, may include determining a correlation value associated with each one of the item tokens, based on determining a correlation of the each one of the item tokens with the first attribute indicator associated with the partition group that includes the item associated with the each one of the item tokens (424).

Figure 5A:
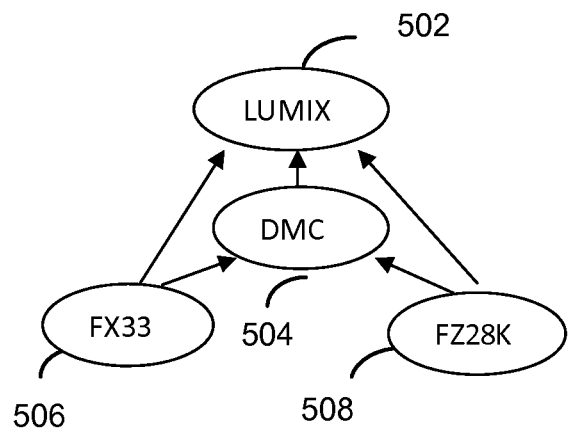
FIGS. 5a-5b depict example hierarchical relationships in a tree structure for catalog dictionaries.
Figure 5B:
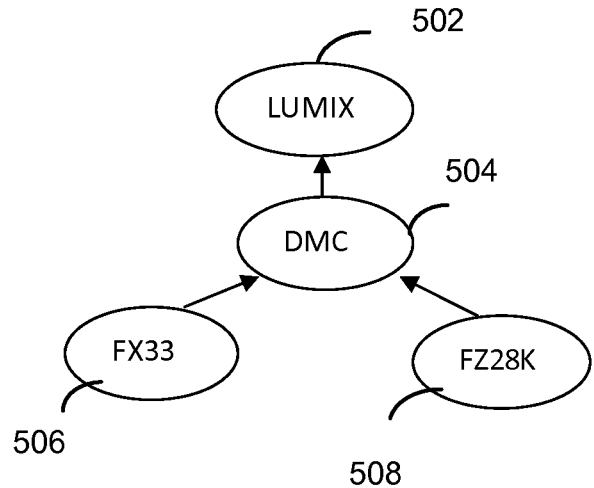

FIGS. 5a-5b depict example hierarchical relationships in a tree structure for catalog dictionaries. As shown in FIG. 5a, nodes LUMIX (502), DMC (504), FX33 (506), and FZ28K (508) are arranged in a tree 500a, as discussed above with regard to Algorithm 8. As discussed above, according to rule 1 of Algorithm 8, LUMIX 502 may be assigned as an ancestor of {FZ28K, FX33} (508, 506) and DMC (504) may be assigned as an ancestor of {FZ28K, FX33}(508, 506). According to rule 2 of Algorithm 8, LUMIX (502) may be assigned as an ancestor of DMC (504).

Thus, Algorithm 8, step 3 may retain an ancestor-descendent edge x-y (e.g., DMC (504)-FX33 (506)) as parent-child edges if y's ancestors are also x's ancestor (e.g., FX33's (506) ancestor LUMIX (502) is also an ancestor of DMC (504)). The example tree 500b as shown in FIG. 5b may be generated by step 3 of Algorithm 8, as discussed above. As shown, DMC (504) retains the ancestor-descendent edge x-y (e.g., DMC (504)-FX33 (506)) as parent-child edges.

Thus, according to an example embodiment, techniques discussed herein may generate dictionaries for hierarchical attributes, based on attributes included in item character strings.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
a dictionary manager embodied via executable instructions stored on a computer-readable storage medium, the dictionary manager including:
an item input engine configured to obtain a plurality of item character strings, each item character string representing an item in a catalog, each item associated with a category;
a brand input engine configured to obtain a plurality of brand character strings associated with the category;
a brand matching engine configured to determine, for each item character string included in the plurality of item character strings, whether a matched substring of the each item character string represents a match with one of the obtained brand character strings;
a matching indicator engine configured to generate a matching indicator indicating that the each item character string includes a match with the one of the obtained brand character strings, based on a match result of the matching determination by the brand matching engine;
a correlated segment engine configured to obtain, for each one of the obtained brand character strings, and for each one of the item character strings that includes a match with the each one of the obtained brand character strings, one or more correlated segments, other than the matched substring, of the each one of the item character strings that includes a match with the each one of the obtained brand character strings, based on determining that the obtained correlated segments are correlated, greater than a predetermined correlation threshold, with the each one of the obtained brand character strings;
a hierarchy generator configured to generate a dictionary hierarchy based on the obtained correlated segments;
a catalog input engine configured to obtain the catalog, the catalog including a list of items represented by item character strings;
a brand expansion engine configured to request an expanded list of brand values based on an initial list of brand values associated with the category; and
a category determination engine configured to request a determination of the category associated with the plurality of item character strings,
the item input engine configured to obtain the plurality of item character strings, each item character string representing an item in the catalog, each item associated with the category, based on the determination of the category determined by the category determination engine.

2. The system of claim 1, wherein:
each one of the plurality of item character strings is associated with one or more of:

a product included in a product catalog or an item included in an enumerated list of items included in a group of items.

3. The system of claim 1, further comprising:
a brand filtering engine configured to filter the expanded list of brand values based on positions of each brand value represented as a substring in groups of the plurality of item character strings.

4. The system of claim 1, further comprising:
a partition initialization engine configured to initialize a plurality of brand partition sets, each brand partition set associated with one of the obtained brand character strings, wherein
the matching indicator engine is configured to generate the matching indicator based on updating the brand partition set associated with the one of the obtained brand character strings that matches the matched substring to indicate an addition of the item associated with the each item character string, based on a match result of the matching determination by the brand matching engine.

5. The system of claim 4, further comprising:
a token determination engine configured to determine a respective plurality of item tokens associated with each respective one of the plurality of item character strings, wherein
the correlated segment engine is configured to determine a correlation value associated with each one of the tokens, based on determining a correlation of the each one of the tokens with the brand character string associated with the brand partition set that includes the item associated with the item character string that includes the each one of the tokens.

6. The system of claim 5, wherein:
the correlated segment engine is configured to determine the correlation value associated with the each one of the tokens, based on a comparison of:
a number of item character strings that are associated with the brand partition set that includes the item associated with the item character string that includes the each one of the tokens, and that include the one of the tokens, and
a number of item character strings that include the one of the tokens.

7. The system of claim 5, further comprising:
a token sequence determination engine configured to determine sequences of tokens included in the each respective one of the plurality of item character strings, the sequences of tokens matching values of attributes associated with the items represented by the plurality of item character strings; and
a cohesion determination engine configured to determine a cohesion value associated with adjacent sequences of tokens included in the each respective one of the plurality of item character strings.

8. The system of claim 5, wherein:
the hierarchy generator is configured to generate the dictionary hierarchy based on obtaining atomic token sequences based on the obtained correlated segments,
updating a tree structure based on the obtained atomic sequences, and
assigning an attribute value to the tree structure.

9. The system of claim 8, wherein:
the tree structure is based on a hierarchical arrangement associated with a hierarchy that is associated with hierarchical attributes associated with the category and the catalog, each of the attributes included as one or more substrings of one or more of the plurality of item character strings.

10. The system of claim 1, further comprising:
a partition initialization engine configured to determine a plurality of brand partition storage areas, each brand partition storage area associated with one of the obtained brand character strings, wherein
the matching indicator engine is configured to store the each item character string in the brand partition storage area associated with one of the obtained brand character strings that matches the matched substring, based on a result of the matching determination by the brand matching engine.

11. A method comprising:
obtaining a plurality of item character strings, each item character string representing an item in a catalog, each item associated with a category;
obtaining a plurality of brand character strings associated with the category;
determining via a device processor, for each item character string included in the plurality of item character strings, whether a matched substring of the each item character string represents a match with one of the obtained brand character strings;
generating a matching indicator indicating that the each item character string includes a match with the one of the obtained brand character strings, based on a match result of the matching determination;
obtaining, for each one of the obtained brand character strings, and for each one of the item character strings that includes a match with the each one of the obtained brand character strings, one or more correlated segments, other than the matched substring, of the each one of the item character strings that includes a match with the each one of the obtained brand character strings, based on determining that the obtained correlated segments are correlated, greater than a predetermined correlation threshold, with the each one of the obtained brand character strings;
generating a dictionary hierarchy based on the obtained correlated segments;
obtaining the catalog, the catalog including a list of items represented by item character strings;
requesting an expanded list of brand values based on an initial list of brand values associated with the category; and
requesting a determination of the category associated with the plurality of item character strings, the plurality of item character strings obtained, based on the determination of the determined category.

12. The method of claim 11, wherein:
each one of the plurality of item character strings is associated with one or more of: a product included in a product catalog or an item included in an enumerated list of items included in a group of items.

13. The method of claim 11, further comprising:
filtering the expanded list of brand values based on positions of each brand value represented as a substring in groups of the plurality of item character strings.

14. The method of claim 11, further comprising:
initializing a plurality of brand partition sets, each brand partition set associated with one of the obtained brand character strings, wherein
the matching indicator is generated based on updating the brand partition set associated with the one of the obtained brand character strings that matches the matched substring to indicate an addition of the item associated with the each item character string, based on a match result of the matching determination by the brand matching engine.

15. A computer program product tangibly embodied on a machine readable storage device and including executable code configured to cause one or more processors to:
  obtain a plurality of item character strings, each item character string representing an item in a catalog, each item associated with a category;
  obtain a plurality of brand character strings associated with the category;
  determine, for each item character string included in the plurality of item character strings, whether a matched substring of the each item character string represents a match with one of the obtained brand character strings;
  generate a matching indicator indicating that the each item character string includes a match with the one of the obtained brand character strings, based on a match result of the matching determination;
  obtain, for each one of the obtained brand character strings, and for each one of the item character strings that includes a match with the each one of the obtained brand character strings, one or more correlated segments, other than the matched substring, of the each one of the item character strings that includes a match with the each one of the obtained brand character strings, based on determining that the obtained correlated segments are correlated, greater than a predetermined correlation threshold, with the each one of the obtained brand character strings;
  generate a dictionary hierarchy based on the obtained correlated segments;
  obtain the catalog, the catalog including a list of items represented by item character strings;
  request an expanded list of brand values based on an initial list of brand values associated with the category; and
  request a determination of the category associated with the plurality of item character strings,
the plurality of item character strings obtained, based on the determination of the determined category.

16. The computer program product of claim 15, wherein the executable code is configured to cause the one or more processors to:
  initialize a plurality of brand partition sets, each brand partition set associated with one of the obtained brand character strings, wherein
  the matching indicator is generated based on updating the brand partition set associated with the one of the obtained brand character strings that matches the matched substring to indicate an addition of the item associated with the each item character string, based on a match result of the matching determination.

17. The computer program product of claim 16, wherein the executable code is configured to cause the one or more processors to:
  determine a respective plurality of item tokens associated with each respective one of the plurality of item character strings, wherein
  a correlation value associated with each one of the tokens is determined, based on determining a correlation of the each one of the tokens with the brand character string associated with the brand partition set that includes the item associated with the item character string that includes the each one of the tokens.

18. The computer program product of claim 17, wherein the executable code is configured to cause the one or more processors to:
  determine the correlation value associated with the each one of the tokens, based on a comparison of:
  a number of item character strings that are associated with the brand partition set that includes the item associated with the item character string that includes the each one of the tokens, and that include the one of the tokens, and
  a number of item character strings that include the one of the tokens.

19. The computer program product of claim 17, wherein the executable code is configured to cause the one or more processors to:
  determine sequences of tokens included in the each respective one of the plurality of item character strings, the sequences of tokens matching values of attributes associated with the items represented by the plurality of item character strings; and
  determine a cohesion value associated with adjacent sequences of tokens included in the each respective one of the plurality of item character strings.

20. The computer program product of claim 17, wherein the executable code is configured to cause the one or more processors to:
  generate the dictionary hierarchy based on:
    obtaining atomic token sequences based on the obtained correlated segments,
    updating a tree structure based on the obtained atomic sequences, and assigning an attribute value to the tree structure.

* * * * *